Figure 1:
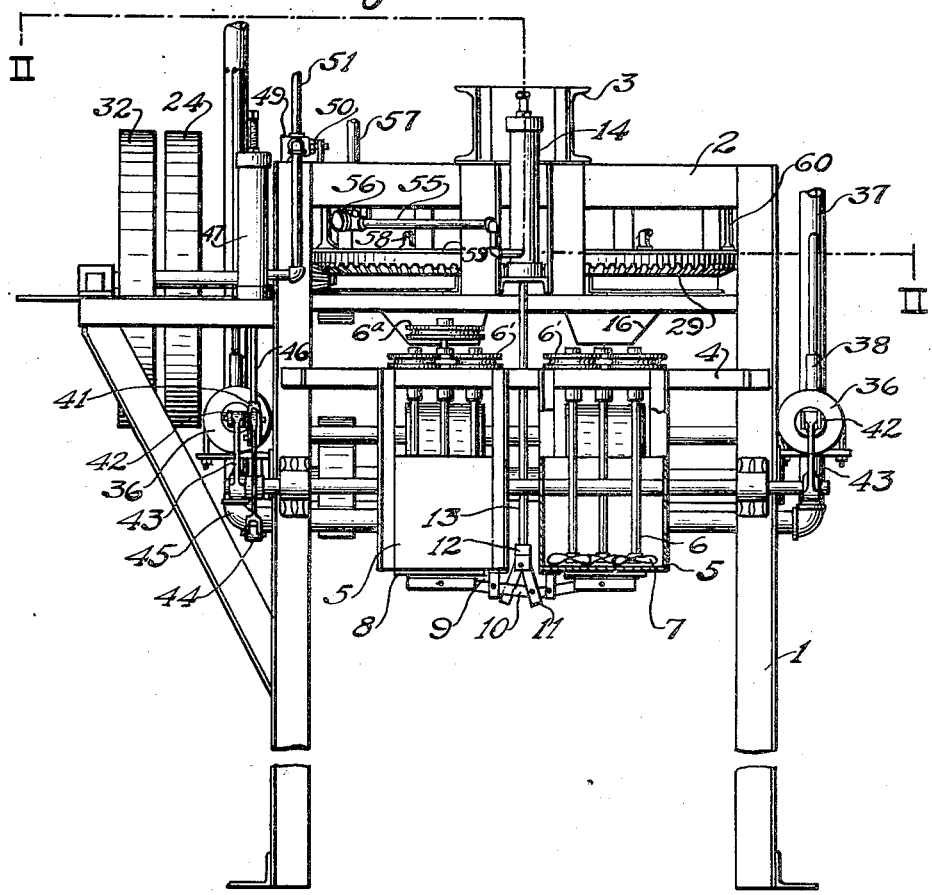

Aug. 17, 1937.  J. B. RITTGERS ET AL  2,090,503
APPARATUS FOR BATCHING AND MIXING CELLULAR CLAY PRODUCTS
Filed Aug. 26 1932  3 Sheets-Sheet 1

INVENTOR
John Bruff Rittgers and
Clarence Sylvester Matheny
by William B. Jasper
Attorney.

Patented Aug. 17, 1937

2,090,503

UNITED STATES PATENT OFFICE 2,090,503

APPARATUS FOR BATCHING AND MIXING CELLULAR CLAY PRODUCTS

John Bruff Rittgers and Clarence Sylvester Matheny, Haydenville, Ohio, assignors to National Fireproofing Corporation, Pittsburgh, Pa., a corporation of Pennsylvania Application August 26, 1932, Serial No. 630,530

2 Claims. (Cl. 83—73)

This invention relates to improvements in apparatus for batching and mixing cellular clay products, and it is among the objects thereof to provide apparatus of simple, compact and durable mechanical construction which shall be adapted to measure off predetermined quantities of the powderous and liquid ingredients and convey and conduct them to a mixing box or mold, and after charging the molds to subject them to a mixing action for a predetermined time whereby the resultant product is of consistently uniform quality and structure.

The product which the present invention is designed to produce is a cellular clay body disposed in copending applications serially numbered 453,395 filed May 17, 1930, and 454,796 filed May 22, 1930, and the primary object of the present invention is to provide machinery for automatically measuring, conveying and mixing the ingredients of which the cellular clay bodies are compounded in such manner as to positively control the product and to facilitate its manufacture, with the resultant economy in the cost of the finished product.

The clay product which is the subject matter of the copending applications referred to consists of a mixtue of clay, gypsum, and dolomite, which is added as a group to water containing in solution a small quantity of sulphuric or hydrochloric acid. The cellularity of the product is produced by gases generated in the action of the carbonate and the acid, the generated gases being permitted to expand freely throughout the mass of the mixture. The mixture is of a heavy cream-like consistency, and the viscosity permits the formation of the cells by preventing the escape of the gases from the mixture. The size of the cells is controlled by the rapidity with which the material sets and which is, to a large degree, controlled by the percentage of gypsum employed, and the temperature of the water.

By maintaining the temperature of the water constant and by employing a uniform quantity of gypsum in fixed proportion to the quantity of clay and dolomite, the cellularity of the resultant product will depend entirely upon the time employed in mixing the ingredients and the liquid in the mixing mold or boxes, and the present invention provides means for positively controlling these factors.

Figure 2:
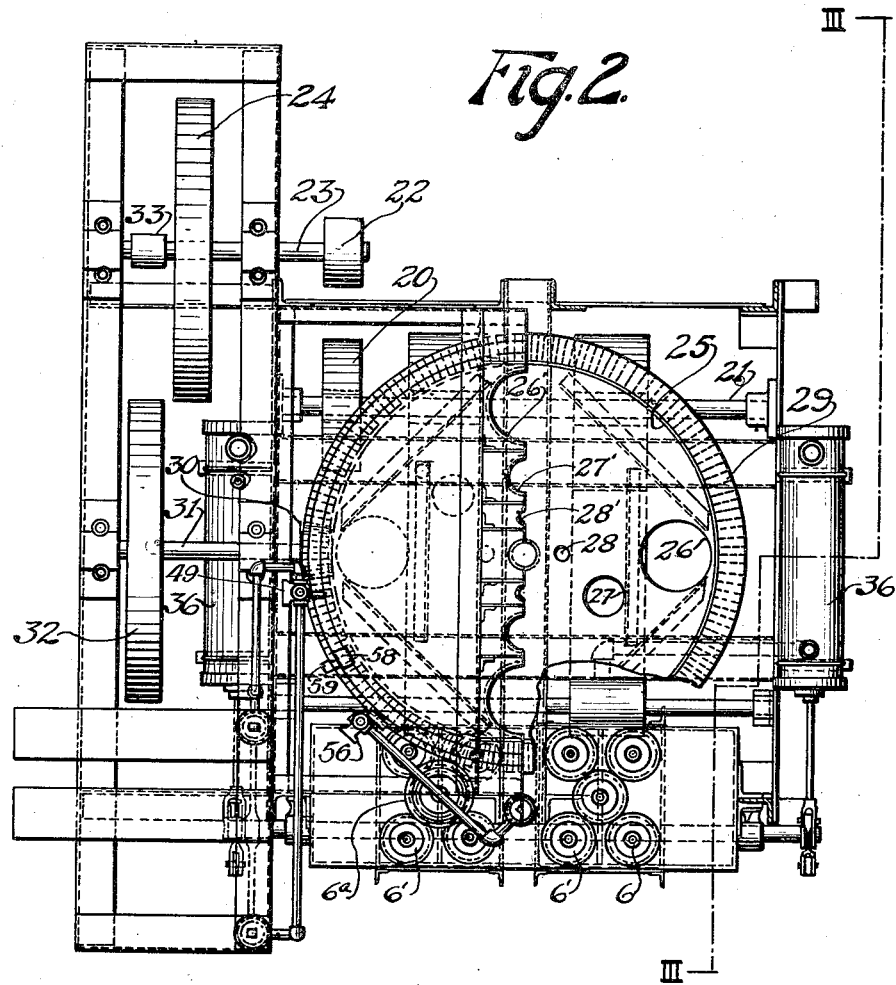
Figure 3:
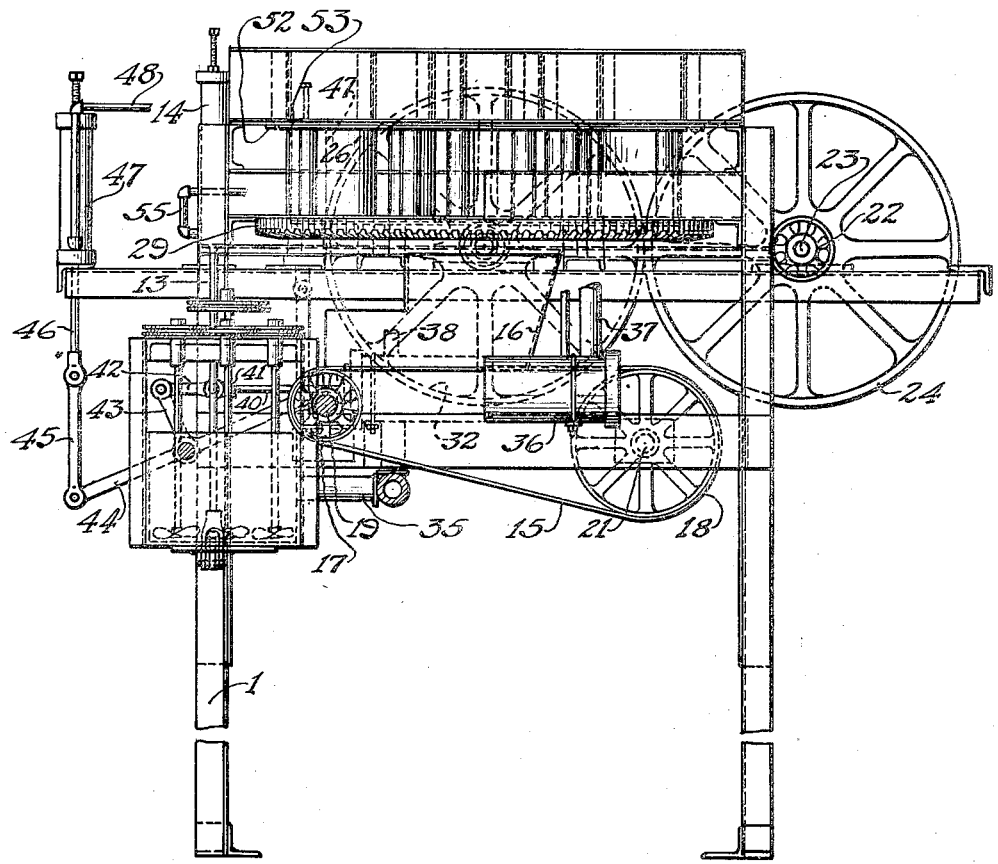

These and further objects of the invention will become more apparent from a consideration of the accompanying drawings constituting a part hereof in which like reference characters designate like parts and in which:

Figure 1 is a front elevational view partly in section of a batching and mixing machine for cellular clay products embodying the principles of this invention;

Figure 2 a plan view thereof partly in section taken along the line II—II of Figure 1; and Figure 3 is a side elevation partly in section taken along the line III—III of Figure 2.

With reference to the several figures of the drawings, the structure therein illustrated comprises a supporting frame structure consisting of uprights or standards designated by the reference numeral 1, having transversely disposed channels 2 which carry channels 3 for mounting a hopper or hoppers from which the powderous ingredients are fed in a manner hereinafter to be explained. The frame 4 is supported on the upright 1 and constitutes the support for a plurality of mixing boxes 5 in which are disposed a plurality of propeller shafts 6 having blades 7 for thoroughly agitating and mixing the mold charges fed thereto. The bottom of the mixing boxes 5 are provided with gates 8 which are hinged at 9 and adapted to be dropped through a mechanical linkage consisting of levers 10 connected by link 11 to a yoke 12 that is operated by a piston rod 13 leading to an air cylinder 14. A piston is disposed in cylinder 14 which, when subjected to fluid pressure, actuates the linkage 10 and 11 and causes the gates 8 to drop thereby discharging the contents of the mixing boxes 5.

The dry powderous ingredients are charged to the mixing boxes 5 by conveyor belts 15 on which the material is dumped through chutes 16, Figure 3, the conveyors passing over pulleys 17 and 18, there being a conveyor for supplying each of the mixing boxes as is shown in Figure 2. Pulleys 17 are mounted on shaft 19 and the conveyors are driven by a pulley 20 on shaft 21 on which pulleys 18 are mounted. Pulley 20 is in alinement with a pulley 22 that is mounted on a jack shaft 23 actuated by a motor driven pulley 24.

As shown in Figure 3, the chutes 16 are directly above the conveyor belts 15, and the upper part of the chute is disposed below a plate 25 which is provided with discharge openings 26, 27 and 28, the openings being graduated to correspond to the sizes of a plurality of pipe measuring hoppers 26', 27' and 28'. The plate 25 is subjected to rotary movement by a ring gear 29 and the graduated openings 26 to 28 inclusive are so arranged on plates 25 that they will register with the pipe measuring hoppers 26' to 28' respectively as the rotating plate passes underneath said hoppers.

In this manner, there is a discharge of material of varying quantities depending upon the openings in plate 25 and the size of hoppers, and the material discharged is dropped by chutes 16 on to the horizontal strands of the conveyor belt 15 by means of which they are conducted to the mixing boxes 5 into which they are charged.

Ring gear 29 is actuated by a pinion 30 mounted on the end of shaft 31 which is actuated by a pulley 32 through a belt connection with a pulley 33 on the motor driven jack shaft 23.

The acid solution hereinbefore mentioned is supplied to the mixing boxes 5 through conduits 35 which are connected to the measuring cylinders 36 of pumps having a supply conduit 37 leading to a supply tank and a venting conduit 38 constituting a return flow for any excess liquid to its source of supply.

The fluid is supplied to the mixing boxes 5 in measured quantities through the piston displacement of the measuring cylinders 36 which is effected through an operating mechanism consisting of the following elements.

Referring to Figures 1 and 3 of the drawings, piston rods 40 of the measuring cylinders are connected to yokes 41 which through connecting rods 42 are connected to rocker arms 43 and 44, the rocker arm 44 in turn being connected by rods 45 to piston rod 46 of an actuating cylinder 47.

The pistons in cylinder 47 are actuated through the application of fluid pressure to a supply conduit 48 leading to a two-way valve 49, Figure 1. Valve 49 is provided with a torsion spring 50 and has a conduit 51 leading to a compressor tank.

The valve 49 is normally biased by the torsion spring 50 to one position and is moved to its other position by a trip 52, Figure 3, which is attached to a plate 53 which rotates in a plane coincident with the upper extremity of the pipe measuring hoppers 26' to 28' inclusive, plate 53 being attached to the rotating plate 25 by vertical braces 53a.

The gate operating cylinder 14 is actuated through fluid pressure supplied by conduit 55 leading to a valve 56 connected by a conduit 57 through the compressor tank.

Valve 56 is operated by a roller 58 mounted on a plate 59 to which the ring gear 29 is attached for one position of its setting and by the spacers 60 secured to the plates 59 to its other position.

The propeller shafts 6 in the mixing boxes 5 are actuated through a series of pulleys 6', these pulleys being of the sheave wheel type for engaging a round belt which is looped around the sheave wheels to render them simultaneously operative. The wheels 6' are actuated by a motor driven pulley 6a which renders all of the propeller blades 7 simultaneously operative in the mixing chambers.

The operation of the above described mechanism is briefly as follows:

The pipe measuring hoppers 26', 27' and 28' are respectively connected with a source of powderous material, the hopper 26' supplying the clay which is employed in the greatest proportion, the hopper 27' the gypsum, and the small hopper 28' the dolomite.

The materials are discharged from the hoppers through their respective openings 26 to 28 into the chutes 16 onto the horizontal strand of the conveyor belt 15 by movement of which they are dumped into the mixing boxes 5. It will be noted that these dry ingredients are not premixed but are successively dumped on the conveyor belts and conveyed to the mixing chambers.

The trip 52 of plate 53 is so disposed on the rotating mechanism that the valve 49 controlling the operation of the measuring cylinders will be tripped at a predetermined time so that a measured volume of the acid solution is caused to flow to the conduit 35 into their respective mixing boxes. Since the propellers 7 or mixing blades are continuously operative, the charge in the mixing boxes 5 will be thoroughly mixed and agitated, and when the trip 58 on the ring gear 29 contacts the arm of valve 56, the piston rod 13 of cylinder 14 will be actuated to dump the gate 8 at the bottom of the mixing chambers whereby the thoroughly mixed charge is dumped from the mixing boxes into suitable molds provided for the purpose. The spacer element 60 of the ring gear 29 will then trip the arm of valve 56 to reverse the operation of the piston rod 13 which closes the gates 8, and the charging of the dry ingredients and the fluid into the mixed boxes automatically takes place in the manner described to repeat the cycle of charging the mixing boxes and mixing the batch to again discharge the same from the bottom of the mold.

As stated under the objects of the invention, the timing of the operation of charging the materials from the hoppers to the conveyor belt and consequently into the mixing boxes, and controlling the application of the liquid to the mixture while maintaining a continuous mixing action of the propellers will assure a product of uniform consistency and quality.

The described apparatus, by conducting the functions of batching and mixing the product automatically, entirely eliminates human error in the process, and furthermore, greatly expedites the mixing of the batch with resulting economies in the manufacture of the product.

Although one embodiment of the invention has been herein illustrated and described, it will be obvious to those skilled in the art that various modifications may be made in the details of construction without departing from the principles herein set forth. For example, instead of utilizing the mixing boxes as attached to the frames 4, it is apparent that the mixing boxes may be eliminated and the frame 4 mounted on the supporting frame structure in a manner to be vertically movable through the piston rod 13 to raise and lower the propeller elements into molds which may be brought in alinement below the measuring and mixing machine. This would require no modification of the present apparatus, and would lend the same to mixing batches in molds mounted on an endless conveyor belt for the purpose.

We claim:

1. A batching and mixing machine comprising a mixing chamber, a plurality of graduated materials containers above said chamber, a liquid measuring device connected to said chamber, a rotary disk disposed between the mixing chamber and materials containers having graduated openings adapted to register with the openings of said containers, valve means for said liquid measuring device, means operative in response to rotation of said disk for opening said valve means to cause the fluid to flow to said chamber, and means for rotating said disk to successively align its openings with the several materials containers and to actuate said liquid measuring valve.

2. A batching and mixing machine comprising a mixing chamber, a plurality of graduated pipe measuring hoppers above said chamber, a rotary disk for sealing the bottom of said pipe measuring hoppers having graduated openings adapted to register with the openings of said hoppers, conveying means beneath the openings of said disk, and liquid measuring means operative in response to rotation of said disk to deliver measured quantities of liquid to said chamber, the rotary movement of said disk causing successive measured charges of materials to be delivered from said pipe measuring hoppers through its openings onto the conveying means.

CLARENCE SYLVESTER MATHENY.
JOHN BRUFF RITTGERS.